United States Patent

Takita et al.

[11] Patent Number: 5,528,952
[45] Date of Patent: Jun. 25, 1996

[54] WEBBED BEVEL GEAR

[75] Inventors: Kenji Takita; Yasuhiro Suzuki; Toshio Kimura, all of Omiya, Japan

[73] Assignee: Mitsubishi Materials Corporation, Tokyo, Japan

[21] Appl. No.: 277,067

[22] Filed: Jul. 19, 1994

[30] Foreign Application Priority Data

Jul. 19, 1993 [JP] Japan ................................. 5-178345

[51] Int. Cl.$^6$ ................................................ F16H 55/17
[52] U.S. Cl. ................................................ 74/459.5
[58] Field of Search ........................ 74/459.5, 417, 74/423

[56] References Cited

U.S. PATENT DOCUMENTS

| | | | |
|---|---|---|---|
| 3,605,518 | 11/1969 | Haller | 74/459.5 |
| 4,308,760 | 1/1982 | Voigtländer et al. | 74/459.5 |
| 5,058,449 | 10/1991 | Lindsey | 74/459.5 |

FOREIGN PATENT DOCUMENTS

| | | | |
|---|---|---|---|
| 63-215329 | 3/1987 | Japan . | |
| 5231498 | 9/1993 | Japan | 74/459.5 |
| 5231496 | 9/1993 | Japan | 74/459.5 |

OTHER PUBLICATIONS

Marks Std. Hnbk for Mech. Engr. 8th Ed© 1978 pp. 8–107.

*Primary Examiner*—Richard M. Lorence
*Assistant Examiner*—David Fenstermacher
*Attorney, Agent, or Firm*—Armstrong, Westerman, Hattori, McLeland & Naughton

[57] ABSTRACT

A webbed bevel gear in which webs are formed of a minimal size so that the gear can be downsized, while also improving the mechanical strength of the gear. The webbed bevel gear is made so as to be capable of avoiding losses from the webs and so that the strength of the dedendum can be maintained by the webs, while the strength and the wear resistance of the dedendum and the tooth surface is further improved. The webbed bevel gears (2, 2a–2c) are constructed as follows: each of the webs is formed with a concave curved surface defined by the base cone so that it can connect the two adjacent teeth at the dedendum between the teeth at the radial end of the gear, the value obtained by dividing the height (h) of the webs in relation to the module (m) of the gear meets the equation $0.2 \leq h/m \leq 0.6$, and the value obtained by dividing the width (w) of the webs along the generating line of the base cone by the width (W) of the gear along the generating line of the base pitch cone meets the equation $0.04 \leq w/W \leq 0.20$. A surface treatment, such as carburizing and/or nitriding is performed in a state in which the webs are coated with a surface treatment inhibitor, or alternatively, the tooth surface and the dedendum, except for the webs, are coated with a hard layer formed of a super hard material.

11 Claims, 5 Drawing Sheets

WEBBED BEVEL GEAR

BACKGROUND OF THE INVENTION

1. Field of the Invention

The present invention relates to a bevel gear used in, for example, a differential gear of an automobile,, and more particularly, to a webbed bevel gear which is improved in mechanical strength by forming webs at the radial outer end of the bevel gear.

2. Description of the Related Art

In general, the strength of the gear is an important factor when considering to downsize a bevel gear, that is, downsizing a bevel gear box, or when also considering to use such a gear for machines with high-power engines.

The strength of the bevel gear is generally proportional to the size and cost of the gear. Accordingly, a current significant problem is how to obtain a bevel gear having a predetermined strength without requiring the enlargement of the gear.

In order to solve the above problem, as disclosed in Japanese Laid-Open Patent No. 63-215329, a webbed bevel gear has been developed in which the mechanical strength of the gear is improved by forming webs at the radial outer end of the gear. The bevel gear disclosed in the above Laid-Open patent was expected to be downsized and, at the same time, to improve the mechanical strength thereof.

Most of the damage arising in a gear results form the loss of a tooth due to bending or from pitting and scoring of the tooth surface. In order to avoid such damage, there have been many attempts to improve the strength of the tooth surface and the dedendum. If bending occurs at the dedendum, power fails to be transmitted so that the gear cannot function properly. In order to prevent such bending, with a view to mitigating the stress in the dedendum and to improving its strength, a webbed bevel gear having webs formed at the radial outer end of the gear has been put into practice.

However, such a conventional gear presents the following problems.

As an example of conventional gears which mitigate the stress in the dedendum, a webbed bevel gear generally denoted as 30 is shown in FIG. 7. Such a gear becomes heavier than conventional gears without webs, and also, the tooth bearing surface must be displaced inward in order to avoid interference with the mating gear. As a result, the transmission torque is decreased, and also, the load capacity is not increased as expected.

Also, in a bevel gear generally denoted as 32 provided with webs at the rear of the gear shown in FIG. 8, the dimensions thereof are increased and the gear box size is accordingly increased, thereby incurring an increase in the weight of differential gears.

Further, in a bevel gear generally denoted as 34 provided with webs to cover the addendum along the rear of the cone as shown in FIG. 9, the diameter of the gear must be increased in order to avoid interference with the mating gear, thereby incurring an increase in the weight of the gear as in the case of the previous gears described above.

SUMMARY OF THE INVENTION

To improve over the webbed bevel gear disclosed in the above Laid-Open patent, the present inventors examined the strength of the gear by varying the shape of the web through experimentation and calculation to discover the following point. When the shape, height and width of the web are respectively set within predetermined ranges, the mechanical strength of the gear is improved, which enables the downsizing of the bevel gear. The present invention is based on the above-noted discovery.

Accordingly, a first object of the present invention is to provide a webbed bevel gear which has webs formed in a minimal size so that the gear can be downsized and can also be improved in mechanical strength.

However, the bevel gear of the known type further presents the following problems.

In order to improve wear resistance and the strength of the gear, the gear generally undergoes carburizing/hardening, shot peening, and the like, after being cut. Even though the bevel gear is provided with webs, a surface treatment, such as carburizing/hardening, is performed to further improve the strength of the tooth surface and the dedendum.

However, a small bevel gear is provided with small webs, which are entirely hardened or embrittled after it is carburized, or the like, thus easily causing a loss from the webs. When the radial outer ends of the webs are lathe-turned and polished after carburizing/hardening so that the webs can be formed into predetermined dimensions, a loss from the webs also easily occurs. Further, when shot peening is performed to provide a residual stress for the tooth surface and the dedendum, the webs might be in danger of being damaged. As described above, if a loss is incurred in the webs, they are unable to achieve their intended purpose, thus resulting in the failure of improving the strength of the dedendum.

In addition to an improvement in the strength of the dedendum by the provision of the webs, there is a demand for further improvements in the strength of the tooth surface and the dedendum. In such a case, it is also necessary to avoid a loss of the webs and to maintain the effect of improving the strength of the dedendum obtained by the provision of the webs.

The present inventors, thus, took note of the following point. Since the webs, which are provided with a view to mitigating the stress in the dedendum so as to improve the strength thereof, are not in contact with a mating gear, they are not required to have a hardness as high as that required for the tooth surface. The present inventors further discovered the following point. The webs will not be permitted to undergo a surface treatment so that a loss from the webs can be avoided, thus maintaining to improve the strength of the dedendum, and thereby further improving the strength, as well as increasing the wear resistance, of the tooth surface and the dedendum. As a result, the present invention is based on the above discoveries.

Accordingly, a second object of the present invention is to provide a webbed bevel gear obtained by forming webs so that a loss from the webs can be avoided, thereby maintaining the effect of improving the strength of the dedendum by the provision of the webs, which results in further improvements in the strength, as well as in an increase in the wear resistance, of the tooth surface and the dedendum.

In order to achieve the above first object, the present invention provides a webbed bevel gear having webs formed at the radial outer end of the gear, characterized in that the value obtained by determining the height (h) of each of the webs from the bottom land in relation to the module (m) of the gear meets the following condition of the equation (1):

$$0.2 \leq h/m \leq 0.6 \qquad (1)$$

The webs may preferably be formed with a concave curved surface intersecting points of the base circle at the radial outer ends of two respective adjacent teeth. When it is difficult to smooth the joint between the tooth surface and the web in a small bevel gear having a small dedendum, the joint may be displaced from the base circle (e.g. extend above the base circle adjacent the teeth) so as to enable to smooth the joint between the two portions.

Also, the width (w) of each of the webs, measured from the back cone line in the direction parallel to the generating line of a base cone, is determined in relation to the width (W) of the gear, measured along the generating line of a base pitch cone, so as to be preferably meet the condition of the following equation (2):

$$0.04 \leq w/W \leq 0.20 \qquad (2)$$

Further, in order to achieve the above second object, the webbed bevel gear of the present invention undergoes a surface treatment, such as carburizing and/or nitriding surface treatment(s) in a state in which the webs are coated with a surface treatment inhibitor.

The surface of the dedendum may preferably be coated with a hard layer. The thickness (t1) of the hard layer may preferably be t1 ≧ 0.03 m in relation to the module (m) of the gear. The webs are not coated with the hard layer. The thickness (t2) of the hard layer applied to the tooth bearing surface may preferably be t2 ≦ 0.15 m in relation to the module (m) of the gear. It is also preferable that the surface of the dedendum may be coated with the hard layer.

According to the webbed bevel gear of the present invention, the height (h) of the web starting from the bottom land is determined in relation to the module (m) of the gear so as to meet the condition of the following equation (1):

$$0.2 \leq h/m \leq 0.6 \qquad (1)$$

and, thus, the stress in the dedendum can be minimized.

In other words, it has been conventionally believed that the greater the height of the webs, the lower the stress in the dedendum, and the more the mechanical strength of the bevel gear is increased. However, according to the experiments performed by the present inventors, it was confirmed that there is a certain optimal range of the height of the webs to minimize the stress in the dedendum. Thus, it is not necessary to form the webs so high that it would be necessary to increase the dimensions of the bevel gear, which also might cause interference with another gear engaging with such a gear. Upon this discovery, the bevel gear can be downsized.

According to the webbed bevel gear of the present invention, the starting points and shape of the webs are defined by the module, the number of teeth, the pressure angle, and the tooth width of the gear. The relationship of the number of teeth z, the pressure angle α, and the diameter of the base circle dg in relation to the module m can be expressed by the following equation (3):

$$m = dg/z \cdot \cos \alpha \qquad (3)$$

The present inventors discovered the following points. The webs are defined by, for example, the base circle used as starting points, and are shaped in accordance with factors such as the number of teeth and the module, and are further measured and placed according to changes in the shearing stress and the vertical stress depending on the pressure angle. With this definition of the webs, the stresses produced in both the dedendum and the webs can be minimized and the actual strength of the gear can be maximized. Based on the above knowledge, the present inventors further found that having the webs so high as to cover the addendum circle is not essential. Instead, it is sufficient to form the webs defined with the base circle used as starting points in order to inhibit the displacement of the addendum and to lower the stresses in the dedendum and on the webs.

More specifically, the webs are subjected to a bending force along the width of the teeth and also to a component of a force acting in the heightwise direction of the teeth, which component is determined by the pressure angle. Accordingly, as the dimensions of the webs increase, the stresses produced in the dedendum become lower. Also, as the width and height of the webs are increased, the stresses produced in the webs is unquestionably decreased. However, as the width of the webs is increased, the width of teeth subjected to a bending stress decreases. Further, rigidity of the radial outer end of the gear is increased according to increases in the width and height of the webs, and accordingly, the surface of the gear engaging with a mating gear must be displaced inward. As a result, when the width and height of the webs exceed predetermined values, the stress produced in the dedendum starts to increase.

Since both the dedendum and the webs are subjected to forces acting in the heightwise direction and in the thicknesswise direction of teeth, which forces are determined by the pressure angle, it is sufficient that the webs have rigidity enough to bear only that component of the above forces allocated to the webs. Thus, the present inventors discovered that there are certain optimal ranges of the dimensions of the webs to maximize the strength of the gear.

Upon this discovery, the webs should be formed with a circular arc defined by the base circle as starting points so that the dimensions of the webs can be within the above optimal ranges. With such dimensions, the webs can be downsized. The addendum at the radial outer end of the mating gear can be partially cut, which can sufficiently avoid interference between the two gears, thus eliminating the necessity of totally changing the dimensions and construction of the gear box. Further, since the strength of the dedendum is improved, the teeth can be protected from bending from the dedendum, or the transfer torque can be increased.

Upon experimentation and analysis of strength by the present inventors, it was confirmed that according to the webbed bevel gear, the height and width of the webs can be defined to meet equation (1) so as to maximize the strength of the dedendum. In other words, it has been conventionally believed that the greater the height and the width of the webs, the lower the stress in the dedendum, and the more the mechanical strength of the bevel gear is increased. However, according to the experiments of the present inventors, it was confirmed that there are certain ranges of the height and width of the webs to maximize the strength of the dedendum.

Also, according to the webbed bevel gear of the present invention, a surface treatment, such as carburizing and/or nitriding, is performed in a state in which the webs are coated with a surface treatment inhibitor, thus protecting the webs from being hardened or embrittled. As a result, the present invention is free from a loss from the webs, thereby maintaining the strength of the dedendum and also increasing the strength, as well as the wear resistance, of the tooth surface.

In addition, a bending stress produced in the surface of the dedendum can be supported by a super hard material.

Further, since the webs are not coated with a hard layer, loss from the webs can also be avoided, while, the strength, as well as the wear resistance, of the dedendum and the tooth surface can be increased by the hard layer. Generally, in most gears, the shape and dimensions of the tooth surface can be substantially uniformly determined in relation to the module. The same is applied to the hertz stress. Therefore, the thickness of the hard layer is defined by a certain ratio of the above two factors.

BRIEF DESCRIPTION OF THE DRAWINGS

The present invention is illustrated by way of example and not limitation in the accompanying drawings, in which like references indicate like parts, and in which.

DETAILED DESCRIPTION OF THE PREFERRED EMBODIMENT

Figure 1:
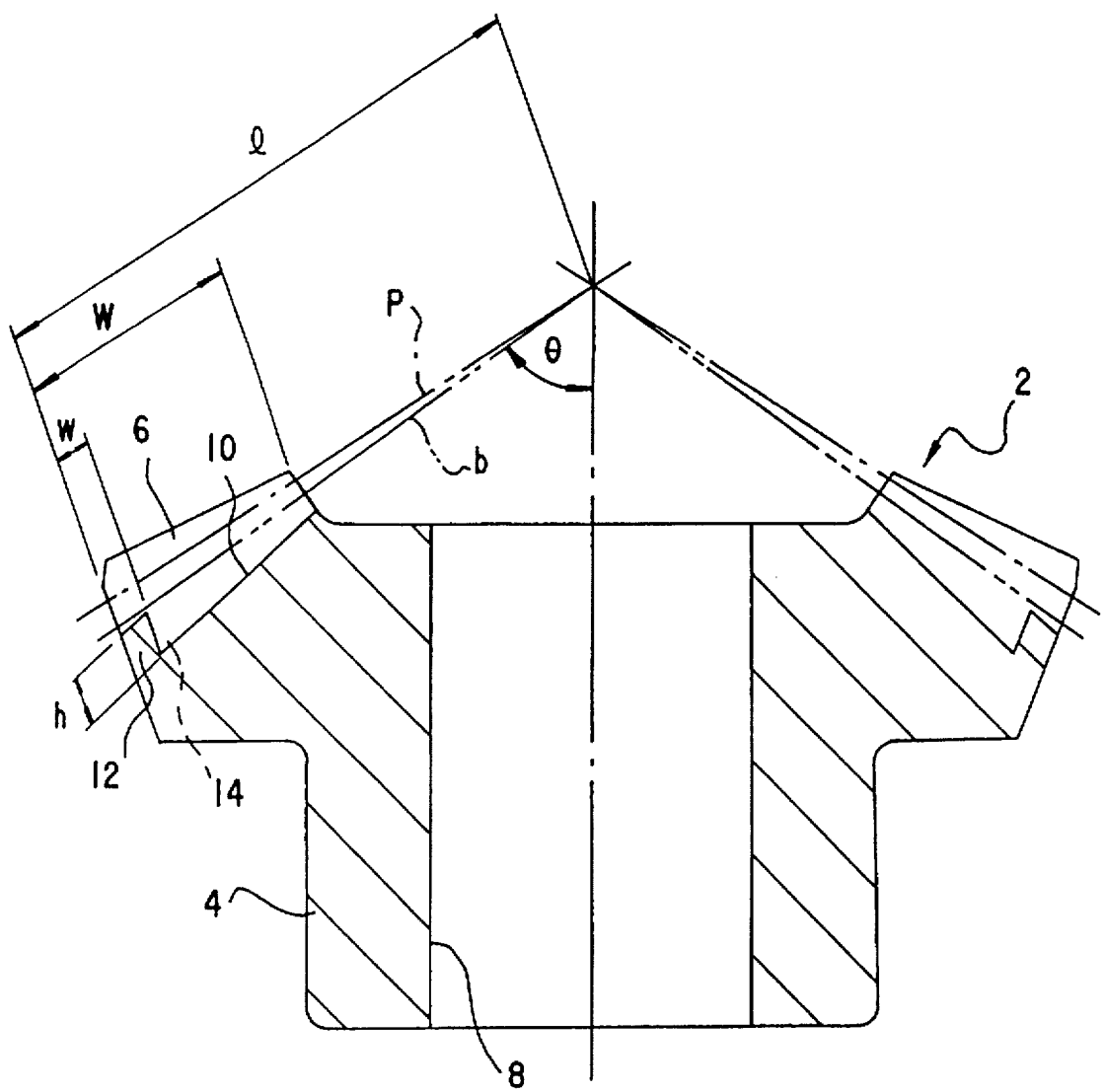
FIG. 1 is a schematic sectional view of a webbed bevel gear according to one embodiment of the present invention.

A webbed bevel gear of the present invention will now be described in detail, based upon embodiments which are illustrated in the drawings.

Figure 2:
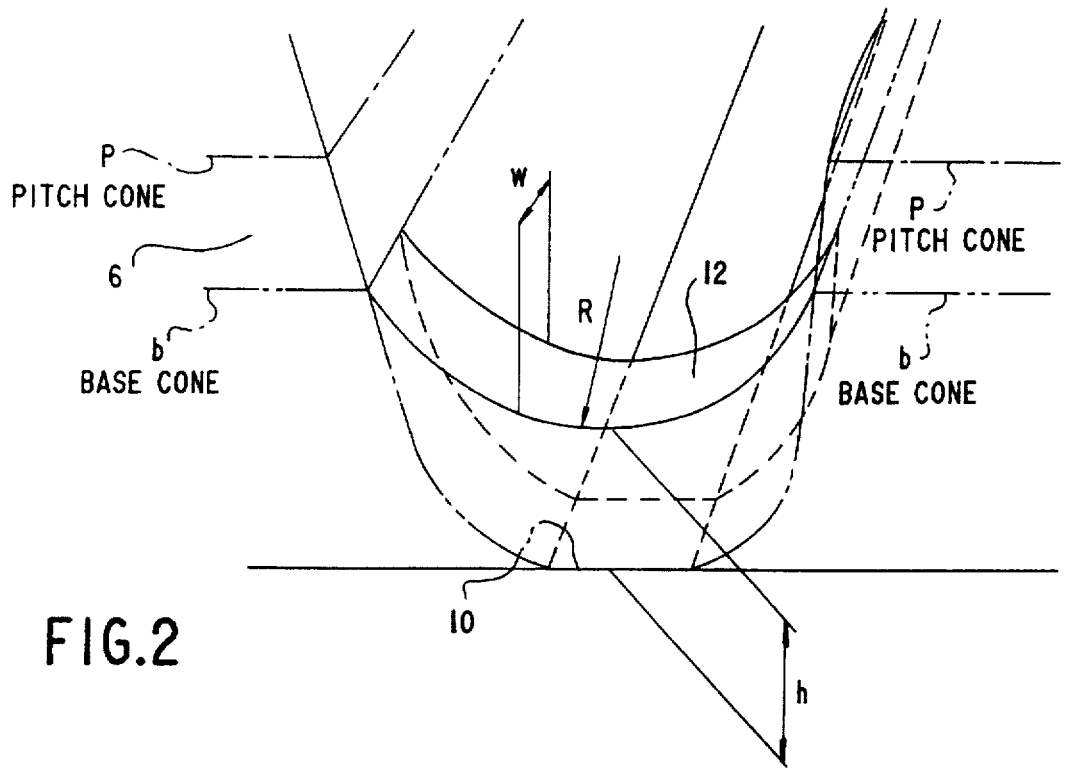
FIG. 2 is a schematic perspective view of the web shown in FIG. 1.
Figure 4:
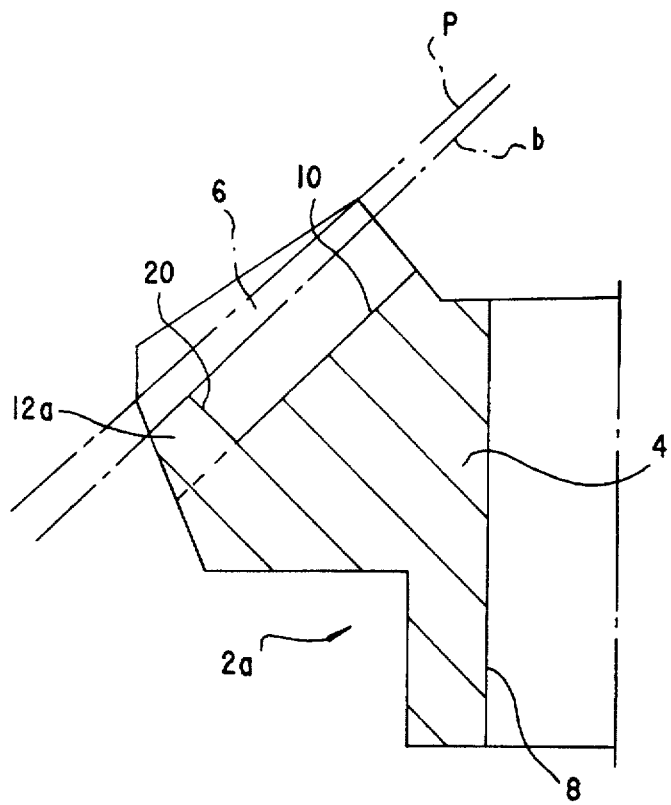
FIG. 4 is a schematic sectional view of a webbed bevel gear according to still another embodiment of the present invention.
Figure 3A:
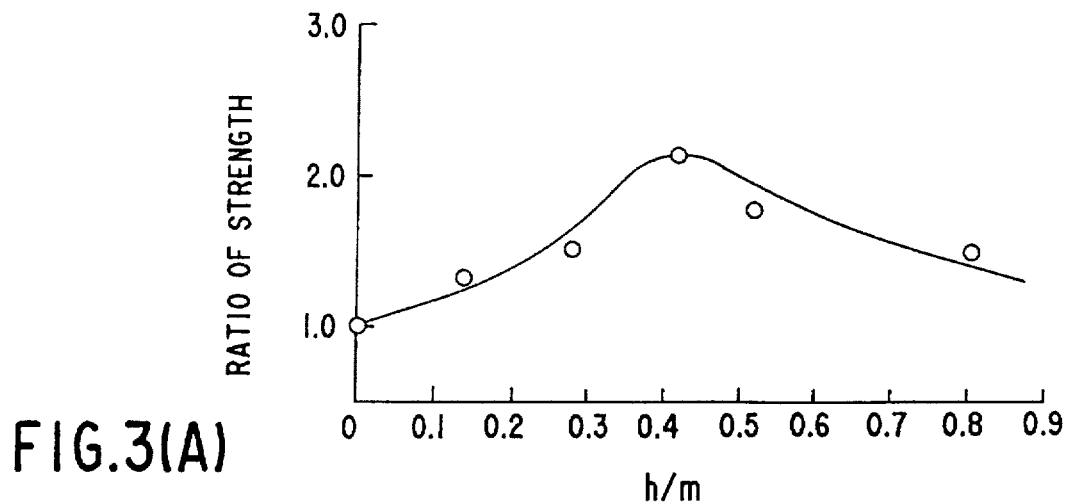
FIGS. 3(A) and 3(B) are diagrams of the height and width, respectively, of the dimensionless web showing that the ratio of strength can be maximized.
Figure 3B:
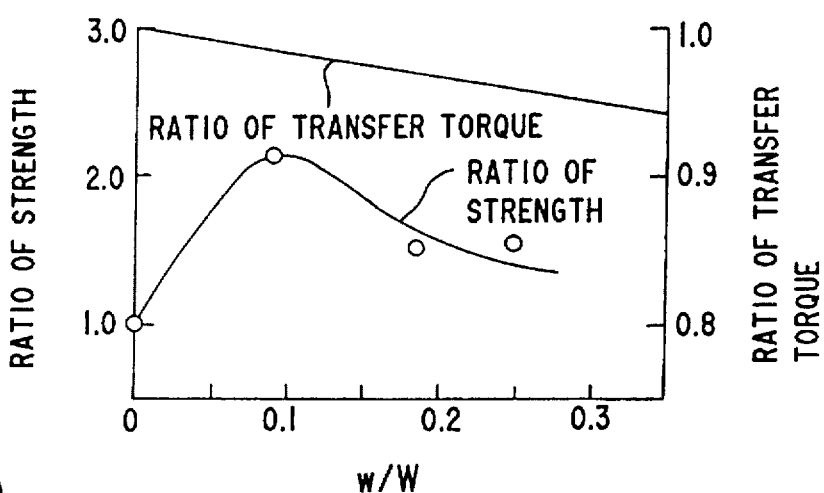

As noted, FIG. 1 is a schematic sectional view of a webbed bevel gear according to one embodiment of the present invention, FIG. 2 is a schematic perspective view of the web shown in FIG. 1, FIGS. 3(A) and 3(B) are diagrams showing the dimensionless height and width of the web, respectively, so that the ratio of strength is maximized, and FIG. 4 is a schematic sectional view of a webbed bevel gear according to another embodiment of the present invention.

As illustrated in FIG. 1, a bevel gear generally denoted by 2 in this embodiment is formed by, for example, a forging method, and comprises a boss 4 and a plurality of gear teeth 6 which are bevelled on the outer periphery of the boss 4. A hole 8 for receiving a shaft, or the like, is formed at the inner periphery of the boss 4.

In the present invention, the specific shapes and dimensions of the bevel gear 2 are not limited. In the, preferred embodiment, however, the conditions of the bevel gear 2 are specified as follows: the number of gear teeth is 16; the cone distance l along the generating line P of the base pitch cone (hereinafter referred to as "the pitch cone P") is 63.1 mm; the cone angle of the pitch cone P is 55° 29'; the width W of the gear tooth 6 along the pitch cone P is 22.5 mm; the cone angle of the top land of the gear tooth is 62° 59'; and the cone angle of the bottom land of the gear tooth is 44° 46'.

As shown in FIGS. 1 and 2, at the radial outer end of the bevel gear 2, a web 12 is formed in the dedendum of the tooth and between the two adjacent gear teeth 6 so as to connect the teeth 6. The height h of the web 12 starting from the bottom land 10 is specified to be perpendicular to the generating line b of the base cone (hereinafter referred to as "the base cone b").

As illustrated in FIG. 2, the top of the web 12 is shaped, for example, as a curved concave surface with a radius R. It is, thus, constructed such that the stress concentration is minimized at the bonding portion between the web 12 and the tooth 6. The radius R, which forms a cone-shaped arc, is determined by three points, that is, two points of the base cone b intersecting with the adjacent teeth, as shown in FIG. 2, and one point of the height h of the web starting from the bottom land, the radius R being 5.4 mm in this embodiment.

In the webbed bevel gear 2 formed in the above shape and dimensions, the height h of the web 12 was varied so as to determine the optimal value. The results are shown in FIG. 3(A). Referring to FIG. 3(A), the height h of the web 12 was determined in relation to the module m of the bevel gear so that it was made dimensionless. A change in the ratio of the strength was examined in relation to the dimensionless height h/m. The radio of the strength of a bevel gear without webs, formed under the same conditions as with the bevel gear of this embodiment, was set to be 1. Then, the ratio of the strength of the bevel gear to the height h in this embodiment was determined.

As is seen from FIG. 3(A), it was discovered that the web has an optimal height h so that the stress in the dedendum can be minimized and the ratio of strength can be maximized. Thus, it was verified that in order to set the ratio of the strength to be approximately 1.5 or more, the range of the dimensionless height h/m should meet the following equation (1):

$$0.2 \leq h/m \leq 0.6 \qquad (1)$$

In other words, it has been conventionally believed that the greater the height of the web, the lower the stress in the dedendum, and the more the mechanical strength of the bevel gear is improved. However, according to the experiments performed by the present inventors, it was confirmed that there is a certain optimal range of the height of the webs to minimize the stress in the dedendum. Thus, it is not necessary to form the web so high that it would be necessary to increase the dimensions of the bevel gear, which otherwise might also cause interference with another gear engaging with such a gear. Upon this discovery, the bevel gear can be downsized. The specific height h of the web 12 is preferably approximately 3 mm in this embodiment.

In the webbed bevel gear 2 formed in the above shape and dimensions, the width w of the web 12 along the base cone b was varied to determine the optimal value. The results are shown in FIG. 3(B) referring to FIG. 3(B), the width w of the web 12 was determined in relation to the width W of the gear tooth 6 along the pitch cone P so that it was made dimensionless. A change in the ratio of strength was examined in relation to the dimensionless width w/W. The ratio of strength of a bevel gear formed under the same conditions as those of the bevel gear of this embodiment, other than that the former gear was not provided with webs, was set to be 1. Then, the ratio of strength of the bevel gear with the width w of this embodiment was determined. FIG. 3(B) illustrates a characteristic curve when the dimensionless height h/m is 0.42.

As is seen from FIG. 3(B), it is verified that the web has an optimal width w so that the stress in the dedendum can be minimized and the ratio of strength can be maximized. Thus, it was confirmed that in order to set the ratio of strength to be approximately 1.5 or more when the dimensionless height h/m is 0.42, the range of the dimensionless width w/W should meet the following equation (2):

$$0.04 \leq w/W \leq 0.20 \tag{2}$$

In other words, it has been conventionally believed that the greater the height of the web, the lower the :stress in the dedendum, and the more the mechanical strength of the bevel gear is improved. However, according to the experiments performed by the present inventors, it is verified that there is a certain optimal range of the width of the web to minimize the stress in the dedendum. Thus, it is not necessary to form the web so wide that it would be necessary to increase the dimensions of the bevel gear, which might also cause interference with another gear engaging with such a gear. Upon this discovery, the bevel gear can be downsized. The specific width w of the web 12 is preferably approximately 2 mm in this embodiment. In this embodiment, the provision of the webs 12 gives rise to a demand for a requirement to avoid a gear from interfering with a mating gear. Thus, the addendum of the mating gear is partially cut, and the tooth bearing surface is slightly moved inward. A loss of the transfer torque due to the movement of the tooth bearing surface is shown in FIG. 3(B). As is seen from FIG. 3(B), the transfer torque is decreased only by approximately 1.5%, which decrease can be sufficiently compensated by the fact that the strength of the dedendum is improved although the transfer torque is increased. Hence, the formation of the webs does not substantially lower any function of the bevel gear.

The present invention is not limited to the above embodiment, but instead, it may be modified in a variety of ways within the scope of the present invention.

Also in this invention, the particular specific shapes and dimensions of the web provided for the bevel gear do not have to be restricted to that of the preferred embodiment. For example, it is, of course, possible to form a rib 14 having a round contour, as shown in dotted lines in FIG. 1, as long as the radius R of the fillet curve along the dedendum so as to connect the dedendum and the web. Furthermore, the circular arc with a radius R shown in FIG. 2 may be formed into another shape so as to mitigate the stress concentration, for example, in the shape of an arc train. The width w of the web 12 can be determined by the smallest width which is possible to be manufactured, as well as according to the equation (2).

Further, as shown in FIG. 4, the present invention may be modified as a bevel gear generally denoted as 2a such that a rear surface 20 of a web 12a is formed perpendicular to the base cone b. The same components of the embodiment shown in FIG. 4 as those shown in FIG. 1 are designated by like reference numerals, and an explanation thereof will, thus, be omitted.

A description will now be given of an embodiment obtained by surface-treating the bevel gear provided with the webs which are formed in the shape described above.

Figure 5:
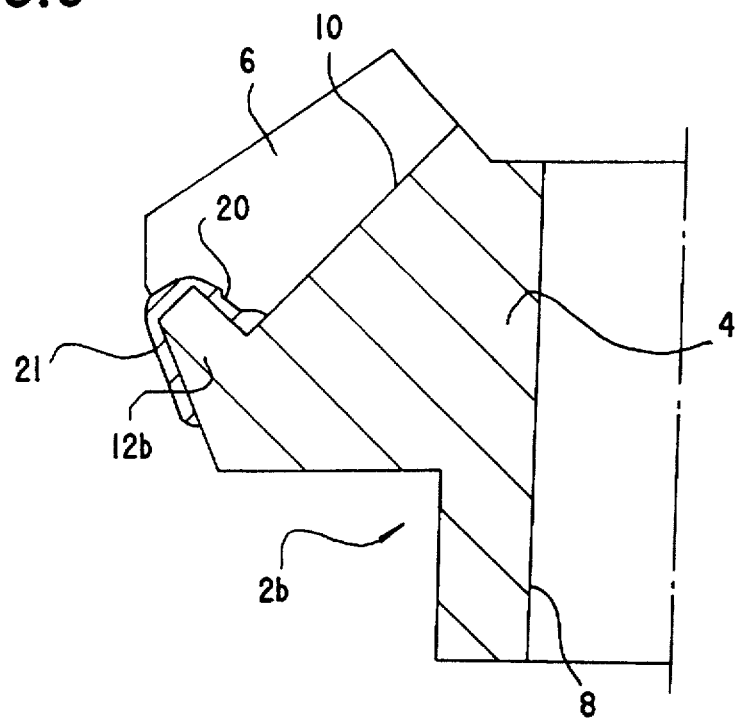
FIG. 5 is a schematic sectional view of a webbed bevel gear according to still another embodiment of the present invention.

In the webbed bevel gear generally denoted 2b illustrated in FIG. 5, the height h and the width w of a web 12b are, respectively, set in the optimal ranges so as to satisfy the above equations (1) and (2), respectively, thereby improving the strength of the dedendum. The bevel gear 2b is followed by a forging method, the base material thereof being formed of steel. However, if the steel is directly carburized and hardened, some bevel gears, particularly, small-sized webbed gears, are hardened and embrittled, and, thus, there is the possibility of damaging the webs.

As illustrated in FIG. 5, before carburizing/hardening is performed as an example of a surface treatment with a view to improving the strength, as well as the wear resistance, of the tooth surface and dedendum, a surface treatment inhibitor 21 is applied to the web 12b. A commercially-available B2O3 anti-carburizing agent may be used as a surface treatment inhibitor 21. Subsequentially, in the state in which the web 12b is coated with the surface treatment inhibitor 21, a predetermined carburizing treatment is performed at a temperature of approximately 930° C., and the temperature is then lowered to at approximately 850° C. After the bevel gear is left for approximately 30 minutes, it is hardened.

When carburizing/hardening is performed according to the process described above, there are improvements in the strength, as well as in the wear resistance, of the tooth surface and the dedendum. And, at the same time, the web 12b is protected from being carburized because of the surface treatment inhibitor 21, thereby preventing the web 12b from becoming hardened and embrittled and avoiding the loss of the web 12b.

The webbed bevel gear 2b, in which the webs 12b are prevented from being surface treated, is, thus, free from a loss of the web 12b, which accordingly fully achieves the intended purpose, thus maintaining the strength of the dedendum and concurrently improving wear resistance.

Since the web 12b is not in contact with a mating gear, it is not required to have a wear resistance as high as that required for the tooth surface, and instead, it is sufficient that the web 12b is capable of bearing a partial force acting on the teeth. Hence, although the web 12b is prevented from being carburized in this embodiment, the strength of the tooth surface and the dedendum is not lowered.

Also, when the web 12b is so small that it is subjected to a limitation in manufacturing conditions, the, cone distance is extended at the radial outer end of the gear and the web 12b is formed thick beforehand. Thereafter, it is necessary to lathe-turn and polish the outer end so that the height h and the width w of the web 12b can satisfy the foregoing equations (1) and (2). In such a case, the web 12b is also protected from being carburized because of the surface treatment inhibitor 21 and carburizing/hardening is performed on the gear, thus eliminating the loss of the web 12b when the outer end is lathe-turned and polished, thereby maintaining the strength of the: dedendum and also improving the wear resistance.

Figure 6:
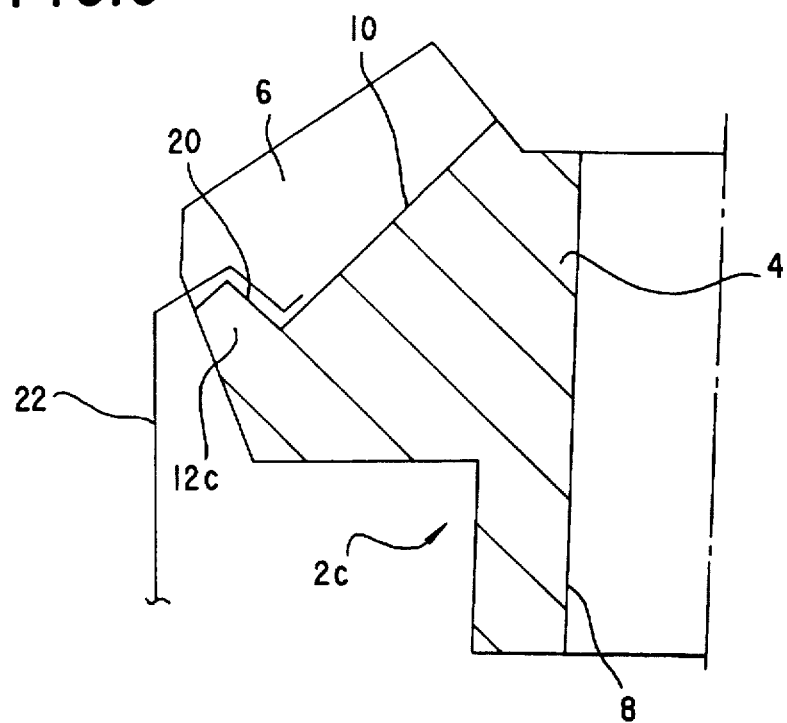
FIG. 6 is a schematic sectional view of a webbed bevel gear according to still another embodiment of the present invention.
Figure 7:
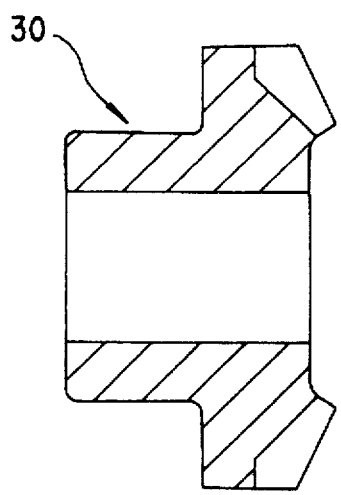
FIG. 7 is a schematic sectional view of a first example of a conventional webbed bevel gear obtained by forming webs at the radial outer end of the gear.
Figure 8:
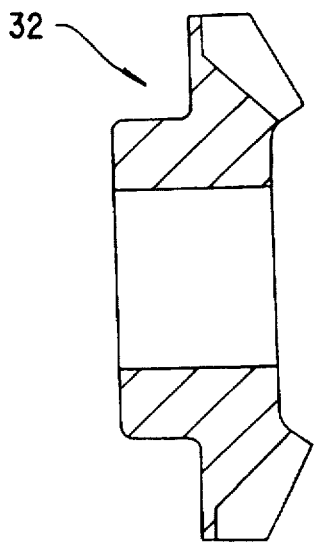
FIG. 8 is a schematic sectional view of a second example of a webbed conventional bevel gear obtained by forming webs at the radial outer end of the gear.
Figure 9:
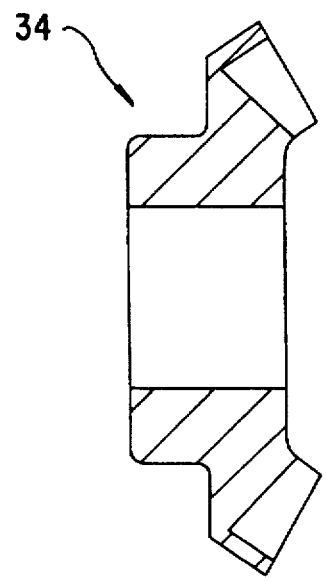
FIG. 9 is a schematic sectional view of a third example of a conventional webbed bevel gear obtained by forming webs at the radial outer end of the gear.

The bevel gear may be provided with a residual stress by a surface treatment, such as surface rolling, rolling, shaving, or shot peening in a state in which the webs are marked with a masking instrument 22 as illustrated in FIG. 6, thereby also hardening the surface of the gear while avoiding a loss of webs and maintaining the strength of the dedendum.

It should be noted that the above embodiments are described for the purpose of simple understanding only and are not intended to limit the present invention. Hence, the components disclosed in the above embodiments are not limited and include all designing modifications and equivalents which cover the technical scope of the present invention. For example, the surface treatment performed on the portions of the gear other than the webs may employ a nitriding treatment, flame-spraying, or the like, as well as the foregoing carburizing/hardening. A webbed bevel gear may be coated with a hard layer, according to the above-noted nitriding treatment, or flame-spraying, as well as the above carburizing/hardening. The present invention is also applicable to a bevel gear in which the body material and the hard layer are formed of other materials, respectively.

As will be clearly understood from the foregoing description, the present invention offers many advantages, including the following advantages.

The dimensions of the webs can be formed in a minimal size so that the gear can be downsized and lightened, while further improving the mechanical strength of the gear.

The webbed bevel gear may undergo a surface treatment, such as carburizing and/or nitriding, except for the web, which is coated with a surface treatment inhibitor, thus avoiding the loss of the webs, and thereby maintaining the strength of the dedendum by the provision of the webs and also increasing the wear resistance.

Further:, the construction of the webbed bevel gear may include coating the surface of the dedendum with a hard layer formed of a super hard material. In such a case, in addition to an improvement in the strength of the dedendum by the provision of the webs, the maximum bending stress occurring in the tooth surface based on the transfer torque can be supported by the super hard material. As a result, even though the transfer torque which causes the bending stress is large, the teeth can be provided with sufficient strength to bear such a bending stress. Thus, a webbed bevel gear which is light in weight and large in transfer torque can be obtained.

Still further, the webs are not coated with a hard layer. Thus, it is possible to obtain a bevel gear in which a loss of the webs can be avoided so that the strength of the dedendum can be maintained by the provision of the webs, while the strength as well as wear resistance of the tooth surface and the dedendum is improved by the hard layer.

As noted, it will be apparent to those skilled in the art that the embodiments described may be varied, such as to meet particular specialized requirements, without departing from the true spirit and scope of the invention as claimed.

We claim:

1. A webbed bevel gear, comprising:

a plurality of teeth around the periphery of said gear;

webs formed between adjacent teeth and at the radial outer end of said gear;

wherein a value obtained by dividing the height of each of said webs from the bottom land, between said teeth, by a module of said gear meets the equation $0.2 \leq$ height/module $\leq 0.6$ wherein the module is defined by the equation; module=$d_g/z*\cos(\text{alpha})$; where $d_g$ is the diameter of the base circle, $z$ is the number of gear teeth, and alpha is the pressure angle.

2. A webbed bevel gear according to claim 1, wherein each of said webs is formed with a concave curved upper surface extending between the intersecting points of a base circle with the radial outer ends of respective two adjacent teeth.

3. A webbed bevel gear according to claim 2, wherein a width of each of said webs, measured from the back cone line in a direction parallel to the generating line of a base cone, is determined in relation to the width of said gear, measured along the generating line of a base pitch cone, so as to meet the equation $0.4 \leq$ width of web/width of gear $\leq 0.2$.

4. A webbed bevel gear according to claim 2, wherein said webs have a surface treatment inhibitor coated thereon for use during a surface treatment of said gear of either carburizing and nitriding.

5. A webbed bevel gear according to claim 2, wherein the surface of at least a portion of the dedendum is coated with a hard layer.

6. A webbed bevel gear according to claim 1, wherein a width of each of said webs, measured from the back cone line in a direction parallel to the generating line of a base cone, is determined in relation to the width of said gear, measured along the generating line of a base pitch cone, so as to meet the equation $0.4 \leq$ width of web/width of gear $\leq 0.2$.

7. A webbed bevel gear according to claim 6, wherein said webs have a surface treatment inhibitor coated thereon for use during a surface treatment of said gear of either carburizing and nitriding.

8. A webbed bevel gear according to claim 6, wherein the surface of at least a portion of the dedendum is coated with a hard layer.

9. A webbed bevel gear according to claim 3, wherein the surface of at least a portion of the dedendum is coated with a hard layer.

10. A webbed bevel gear according to claim 1, wherein said webs have a surface treatment inhibitor coated thereon for use during a surface treatment of said gear of either carburizing and nitriding.

11. A webbed bevel gear according to claim 1, wherein the surface of at least a portion of the dedendum is coated with a hard layer.

* * * * *

UNITED STATES PATENT AND TRADEMARK OFFICE
CERTIFICATE OF CORRECTION

PATENT NO.:   5,528,952
DATED     :   June 25, 1996
INVENTOR(S):  TAKITA et al.

It is certified that error appears in the above-identified patent and that said Letters Patent is hereby corrected as shown below:

Column 10, lines 13 - 14, "0.4≤ width of web/width of gear ≤0.2" should read --0.04≤ width of web/width of gear ≤0.2.--.

Column 10, lines 27 - 28, "0.4≤ width of web/width of gear ≤0.2" should read --0.04≤ width of web/width of gear ≤0.2.--.

Signed and Sealed this

Tenth Day of December, 1996

BRUCE LEHMAN

Attest:

Attesting Officer

Commissioner of Patents and Trademarks